United States Patent [19]
Leonard

[11] 3,919,914
[45] Nov. 18, 1975

[54] KEYBOARD INSTRUMENT HAND COORDINATION TRAINER

[76] Inventor: Verna M. Leonard, 8701 Highway 41, Fresno, Calif. 93721

[22] Filed: Jan. 29, 1975

[21] Appl. No.: 545,207

[52] U.S. Cl. .................................................. 84/474
[51] Int. Cl.² ........................................ G09B 15/02
[58] Field of Search .............................. 84/470–485

[56] References Cited
UNITED STATES PATENTS

| | | | |
|---|---|---|---|
| 741,017 | 10/1903 | Curtiss | 84/480 |
| 765,937 | 7/1904 | Reese | 84/480 |
| 1,506,156 | 8/1924 | Björklund-Asperen | 84/481 X |
| 3,822,630 | 7/1974 | Leonard | 84/471 |

Primary Examiner—Lawrence R. Franklin
Attorney, Agent, or Firm—Ralph S. Branscomb

[57] ABSTRACT

The invention is directed toward developing rhythm and coordination between the left and right hands in young piano students and comprises an envelope having two groups of selectively exposable strips having indicia thereon indicating the scale tone names of chord inversions such that each group of strips represents all of the inversions of a particular chord, so that the student selects a different inversion strip from each group and plays the tones displayed thereon according to rhythm dictated by the tone spacing with left and right hands together so that coordination and familiarity with the different chord inversions is developed. Between the strip groups is a third group of strips displaying count numbers or musical notes to indicate the length of each tone. musical staff paper is provided for insertion in the envelope, the staffs thereon being visible above the front panel of the envelope and having notes thereon corresponding to the scale tones named in the strips so that the student can associate note reading with hand positions after coordination has been developed.

8 Claims, 2 Drawing Figures

Fig. 1

KEYBOARD INSTRUMENT HAND COORDINATION TRAINER

BACKGROUND OF THE INVENTION

The invention is in the field of musical teaching aids for children and is directed particularly toward developing coordination between the hands based on rhythm rather than as related through the notes of written music.

One of the more difficult skills a beginning piano student must acquire is an agile facility with the hands when used simultaneously to play the bass and treble staffs of a composition. In the past this skill has been gained more or less incidentally by repetitive keyboard practice using musical scores with no specific emphasis on hand synchronization and the integral concept of rhythm.

SUMMARY OF THE INVENTION

The present invention provides a vehicle for the development of hand coordination and rhythm and is specifically tailored to this end without requiring or necessarily involving the understanding of note reading. Rather than being provided with note symbols, the student works with strips having the letter names of the scale tones of chord inversions and rests spaced according to the rhythm with which the tones are to be played. The strips are mounted in two groups on an upper and lower portion of a panel, relating to the right and left hands respectively, so that the piano keys corresponding to the scale tones are dictated for each hand separately without the use of written notes. Each of the strips in each group bears a scale tone arrangement different from the other strips in the group, although the strips in one group may be the same as the strips in the other group. It is preferred that the strips in each separate group represent all the inversions of a particular chord, so the inversions in one group could be played with any of the inversions in the other group without sounding discordant.

A third grooup of strips centered between the first two is provided with notes and rests indicating the duration of the scale tone and rests named in the upper and lower strips so that familiarity with the appearance of notes relating to certain tone lengths is developed. An additional strip displaying the numbered time count of the named scale tones, may be included to further emphasize the establishment of a regular rhythm, and the panel on which the strips are mounted may serve as the front of an envelope into which musical staff paper with the notes corresponding to the selected scale tones is inserted, so that after hand coordination has been developed, note reading may be learned.

DETAILED DESCRIPTION OF THE PREFERRED EMBODIMENT

Figure 1:
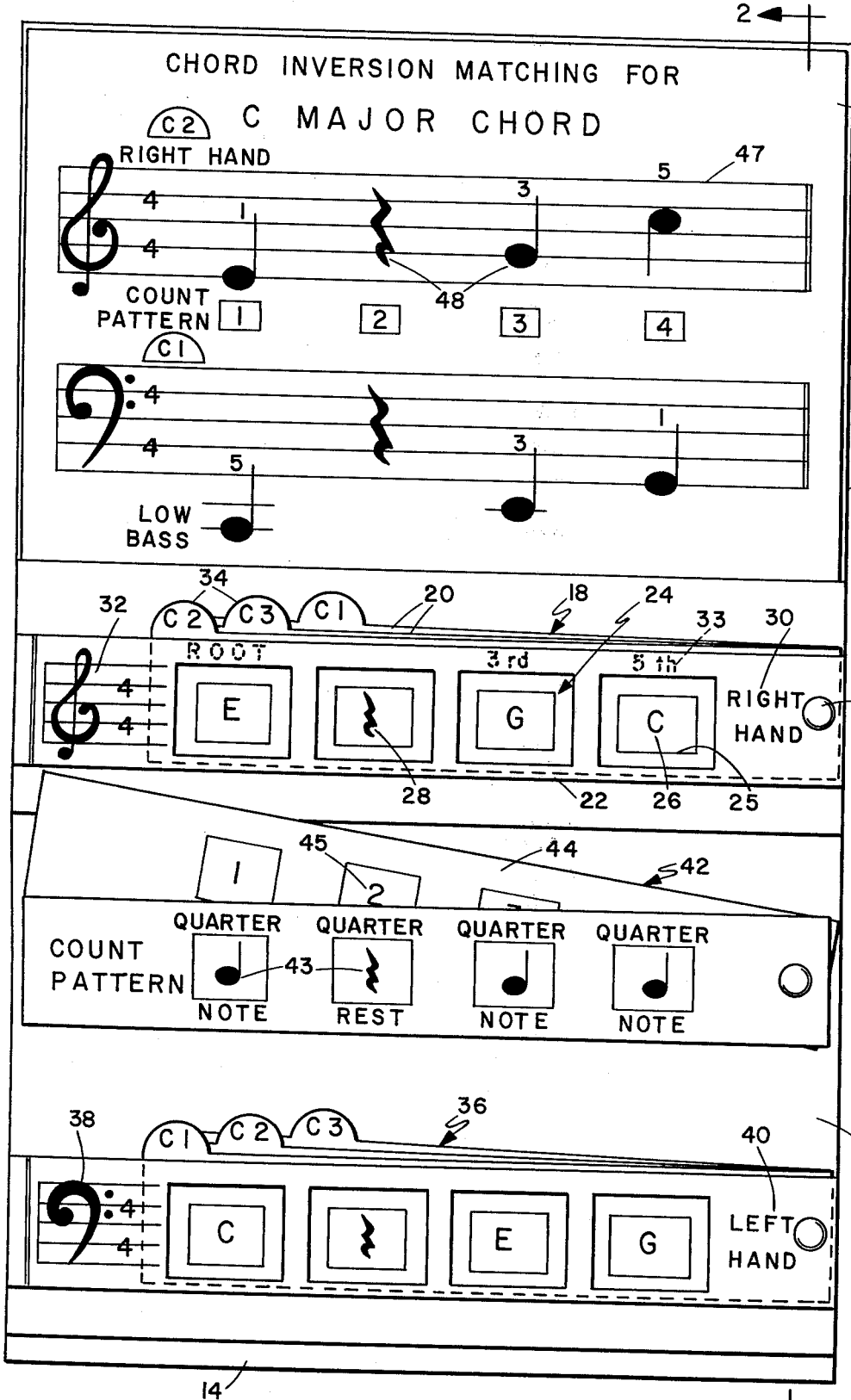
FIG. 1 is a front elevation view of the invention.
Figure 2:
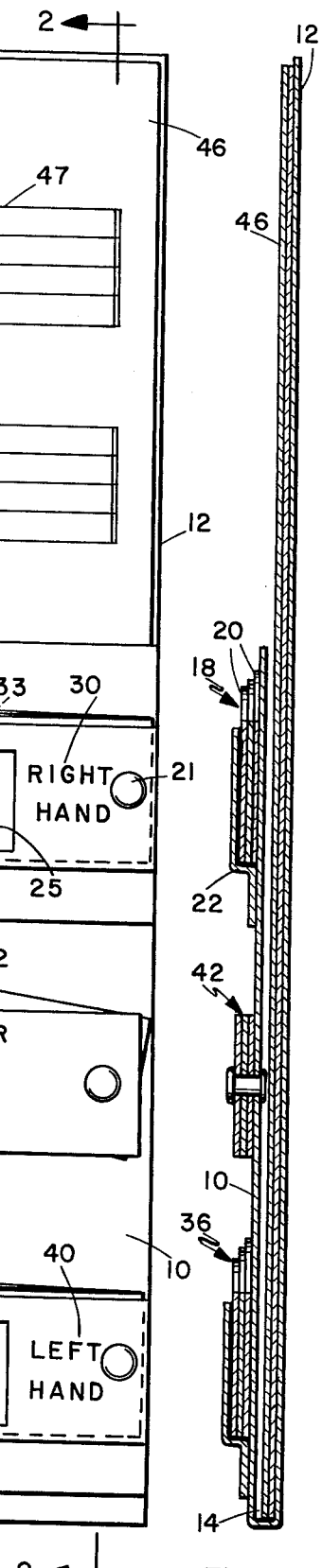
FIG. 2 is a sectional view taken along lines 2—2 of FIG. 1.

The invention has a front panel 10 and a rear sheet 12 which are joined together at least along their bottom edges, or may be formed by folding a single sheet of heavy paper or the like, so that an envelope 14 is defined. This structure should be rigid enough to stand upright on a piano music rack, and orientation for purposes of this description and the appended claims is assumed to be vertical although clearly the device would be equally functional horizontally.

Secured to an upper portion of the panel 10 is a first group 18 of strips 20 which may be pivoted to the panel as by a rivet 21, seated in a pocket-forming member 22, or both, the strips in any case being selectively exposable so that any one of them may be displayed individually. Each of the strips is provided with an array of indicia 24 denoting in incrementally spaced squares the letter names of scale tones 26 with possibly one or more rests as at 28. As indicated at 30 the hand which is to be used to play the scale tones is identified, and the indicia 24 are evenly spaced in keeping with the idea of teaching rhythm. If the members 22 are used, they are provided with windows 25. The clef and time signature 32 in which the scale tones are to be played is also indicated. In addition, the scale degrees, indicated at 33, may be printed above the indicia 26 so as to be hidden from view when the strips are in the pockets, so that the student may be quizzed.

If the scale tones are selected from a particular chord or inversion thereof, this information should be included on the strips as at 34, wherein "C-1" indicated the first inversion of the C major chord (conventionally, these scale tones would fall in what is called the principal C chord rather than the first inversion, but the inversion terminology is used in this manner for reasons not of present significance.).

A second group of strips 36 is secured to the panel near the bottom and is, or could be, identical to the first group in the method of attachment and indicia, except for the clef sign 38 and hand selection 40, the numeralogy otherwise being identical to the first group.

The manner in which the device as thus far described is used as follows. The student, who must be cognizant of the letter naming of the piano keys, selects one of the strips from each group and with his right hand plays the keys identified by letter from the top strip, and plays the lower strip simultaneously with his left hand, the rhythm being established by the spacing of the scale tones and rests on the strips. It is desirable that the groups 18 and 36 both comprise strips displaying the inversions of a particular chord (including the principal chord) so that any of the strips in one group can be played with any of the strips of the other group without producing discord, since all the scale tones in a particular chord are compatible. Familiarity with the different inversions of the chords is also developed, which is a collateral skill which the invention is intended to teach.

A third group of strips 42 may be pivoted to the panel, these strips displaying in vertical alignment with the scale tone names and rests of the other strips the notes and rests 43 corresponding thereto so that the student can correlate the duration of each note with the appropriate symbol for the note. The strips 42, of course, need not be provided in the same number as the other strip groups since the rhythm pattern to which the notes relate may be duplicated for one or more of the inversions. One or more strips 44 may also be provided to display time count numbers 45 again in vertical alignment with the scale tones on the first and second strip groups. The time count numbers are of utility in training the student in basic even count rhythm in which all tones and rests have the same time value. The strips 44 may be used to establish a count whether the rests in the strips selected from the groups 16 and 36 are synchronized or not, although it is preferable for beginners that the rhythm (position of the rests) be identical for both hands.

Continuing beyond the teaching of the note and rest shapes representing the different tone and rest durations, the invention includes several sheets of paper 46 dimensioned to fit within the envelope 14 and extend beyond the envelope top. The upper portions of the sheets are provided with musical staffs 47 having the notes and rests 48 thereon corresponding to the scale tones of a selected pair of the strips from the upper and lower of the strip groups. A number of these sheets may be necessary to accomodate all the possible combination of chord inversions so that the sheets 46 may be printed on the bottoms and reverse sides as well as the top front as shown.

The invention can clearly be varied to include entire chord series instead of the individual scale tones and notes 16 and 43, and the time signature and note duration varied as desired. It is intended that a student use the trainer with no, or very little, aid from an instructor, and learn hand coordination by playing from the strip groups 18 and 36, then progressing to the strips 42 to learn the note types associated with scale tone duration, and finally, by incorporating the staff sheets 46 into the exercises, master note reading after, rather than before, hand coordination is developed.

I claim:

1. A hand coordination aid for keyboard instrument students comprising:
   a. a planar panel;
   b. two groups of selectively exposable horizontally extended strips secured to said panel, one of said groups being spaced above the other of said groups;
   c. said strips each having thereon a longitudinal array of incrementally spaced indicia denoting at least some of the names of the scale tones of a chord and having indicia identifying the chord;
   d. said coordination aid having indicia identifying one of said groups of strips with the left hand and the other of said groups with the right hand, whereby a student can play the scale tones denoted on the exposed strip of one of said groups with one hand and simultaneously play the scale tones of the exposed strip of the other of said groups with the other hand to develop coordination between the left and right hands.

2. Structure according to claim 1 wherein the individual strips of each individual group each denote scale tone names of an inversion of a particular chord such that the totality of strips of each group represent all possible inversion of the particular chord.

3. Structure according to claim 1 wherein the scale tone names on the strips of the upper of said groups are vertically aligned with the scale tone names of the lower of said strips whereby the one-to-one correspondence of right-hand and left-hand note playing is graphically displayed.

4. Structure according to claim 3 and including a third group of selectively exposable strips spaced between said first and second group of strips, each of the strips of said third group having indicia vertically aligned with the indicia on said upper and lower groups of strips denoting notes which indicate the time duration for which said scale tones are to be played.

5. Structure according to claim 4 and including a strip in said third group having a display of time count numbers vertically aligned with the individual named scale tones of said first and second strips, whereby an even count rhythm is established for the student.

6. Structure according to claim 1 wherein said groups of strips are pivoted at the ends thereof to said panel.

7. Structure according to claim 1 and including elongated pockets mounted on said panel in which said groups of strips are received, said pockets having apertures therein through which the indicia on the selected ones of said strips are visible.

8. Structure according to claim 7 and including indicia identifying on said strips the scale degrees of the scale tones thereon, said scale degree being hidden when the strips are within one of said pockets and exposed when the strip is outside of the pockets such that the user may be quizzed on the scale degrees of the named scale tones.

* * * * *